(12) United States Patent
Choi (10) Patent No.: US 8,063,851 B2
(45) Date of Patent: Nov. 22, 2011

(54) LIQUID CRYSTAL DISPLAY MODULE

(75) Inventor: Ik Chang Choi, Pohang-si (KR)

(73) Assignee: LG Display Co., Ltd., Seoul (KR)

(*) Notice: Subject to any disclaimer, the term of this patent is extended or adjusted under 35 U.S.C. 154(b) by 467 days.

(21) Appl. No.: 12/266,055

(22) Filed: Nov. 6, 2008

(65) Prior Publication Data

US 2009/0207102 A1 Aug. 20, 2009

(30) Foreign Application Priority Data

Feb. 20, 2008 (KR) .................. 10-2008-0015262

(51) Int. Cl.
*G02F 1/1333* (2006.01)

(52) U.S. Cl. ............. 345/58; 362/632; 345/87; 345/156

(58) Field of Classification Search .......... 345/58, 345/87, 156; 362/632
See application file for complete search history.

(56) References Cited

U.S. PATENT DOCUMENTS

2002/0080113 A1* 6/2002 Kim ............................ 345/156
2006/0291254 A1* 12/2006 Jeong et al. ................... 362/632
2010/0207855 A1* 8/2010 Park et al. ....................... 345/87

FOREIGN PATENT DOCUMENTS

JP          2000244150 A  *  9/2000

* cited by examiner

*Primary Examiner* — Amare Mengistu
*Assistant Examiner* — Joseph G Rodriguez
(74) *Attorney, Agent, or Firm* — Brinks Hofer Gilson & Lione (57) ABSTRACT

A liquid crystal display module includes a bottom case; a backlight assembly on the bottom case; a liquid crystal panel on the backlight assembly; a top case covering peripheral portions of the liquid crystal panel; a main supporter having a frame shape and surrounding side portions of the liquid crystal panel; a plurality of guide ribs on an outer side of the main supporter; a driving PCB on the plurality of guide ribs and inclined such that a distance between the driving PCB and the outer side of the main supporter increases along a direction of the bottom case to the top case due to the guide ribs; and a COF film connecting the driving PCB to the liquid crystal panel.

9 Claims, 9 Drawing Sheets

LIQUID CRYSTAL DISPLAY MODULE

The present invention claims the benefit of Korean Patent Application No. 10-2008-0015262, filed in Korea on Feb. 20, 2008, which is hereby incorporated by reference for all purposes as if fully set forth herein.

BACKGROUND OF THE INVENTION

1. Field of the Invention

The present invention relates to a liquid crystal display module.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

Figure 1:
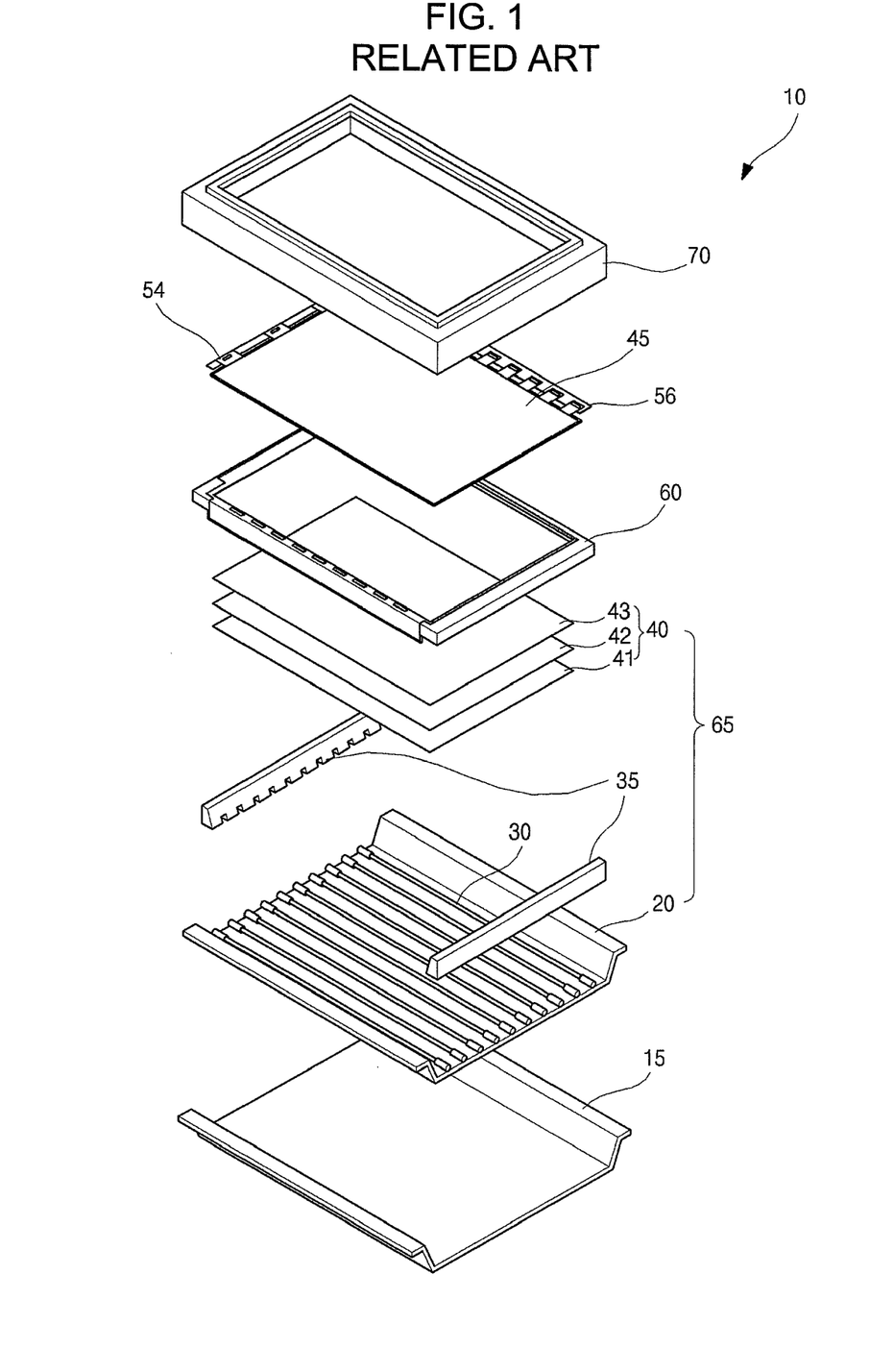
FIG. 1 is a perspective view of a LCD module according to the related art.

FIG. 1 is a perspective view of a LCD module according to the related art.

Referring to FIG. 1, the LCD module 10 includes a liquid crystal panel 45, a backlight assembly 65, a main supporter 60, a top case 70 and a bottom case 15.

The bottom case 15 is located at the bottom of the LCD module 10. A reflector 20 is located on an inner surface of the bottom case 15. The backlight assembly 65 is located on the reflector 20. The backlight assembly 65 includes a plurality of lamps 30 parallel to one another, and a plurality of optical sheets 40 on the lamps 30. The plurality of optical sheets 40 includes a diffusion sheet 41, a prism sheet 42 and a protection sheet 43. The main supporter 30 has a rectangular frame shape and surrounds the plurality of optical sheets 40 and the liquid crystal panel 45. The main supporter 30 is coupled with the bottom case 15. The top case 70 is located at the top of the LCD module 10. The top case 70 covers peripheral portions of the liquid crystal panel 45 and is coupled with the main supporter 60 and the bottom case 15. A pair of lamp guiders 35 fixes both ends of the lamps 30. The lamp guiders 35 are coupled with the bottom case 50.

A gate driving PCB (printed circuit board) 54 and a data driving PCB 56 are coupled with the liquid crystal panel 45 using TCP (tape carrier package) technology. TCP technology uses a TAB (tape automated bonding) film which connects the driving PCBs 54 and 56 to the liquid crystal panel 45. However, it is difficult to make inner leads in the TAB film straight, and there thus is a limit to achieving the fine pitch required for high resolution.

To achieve the fine pitch, COF (chip on flexible printed circuit) technology has been suggested. COF technology uses a COF film on which gate or data driving chip is installed directly. The COF film has a double-layered structure without adhesives and copper lines in the COF film are very thin, for example, 8 μm, and the fine pitch is thus feasible. Accordingly, the COF film is employed in high resolution LCD devices.

However, as the size of the LCD module has recently increased, due to material property and elasticity of the COF film connected to the liquid crystal panel, the liquid crystal panel is thus lifted up off a correct position. Accordingly, the LCD module is defective, and production efficiency is reduced.

Figure 2A:
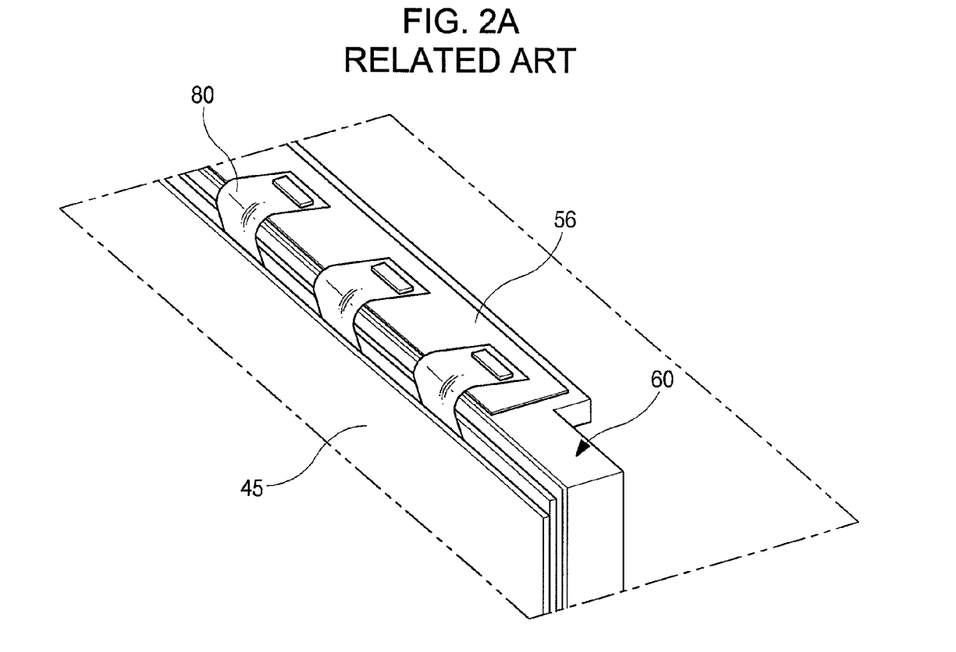
FIG. 2A is a perspective view illustrating a portion of the LCD module according to the related art.
Figure 2B:
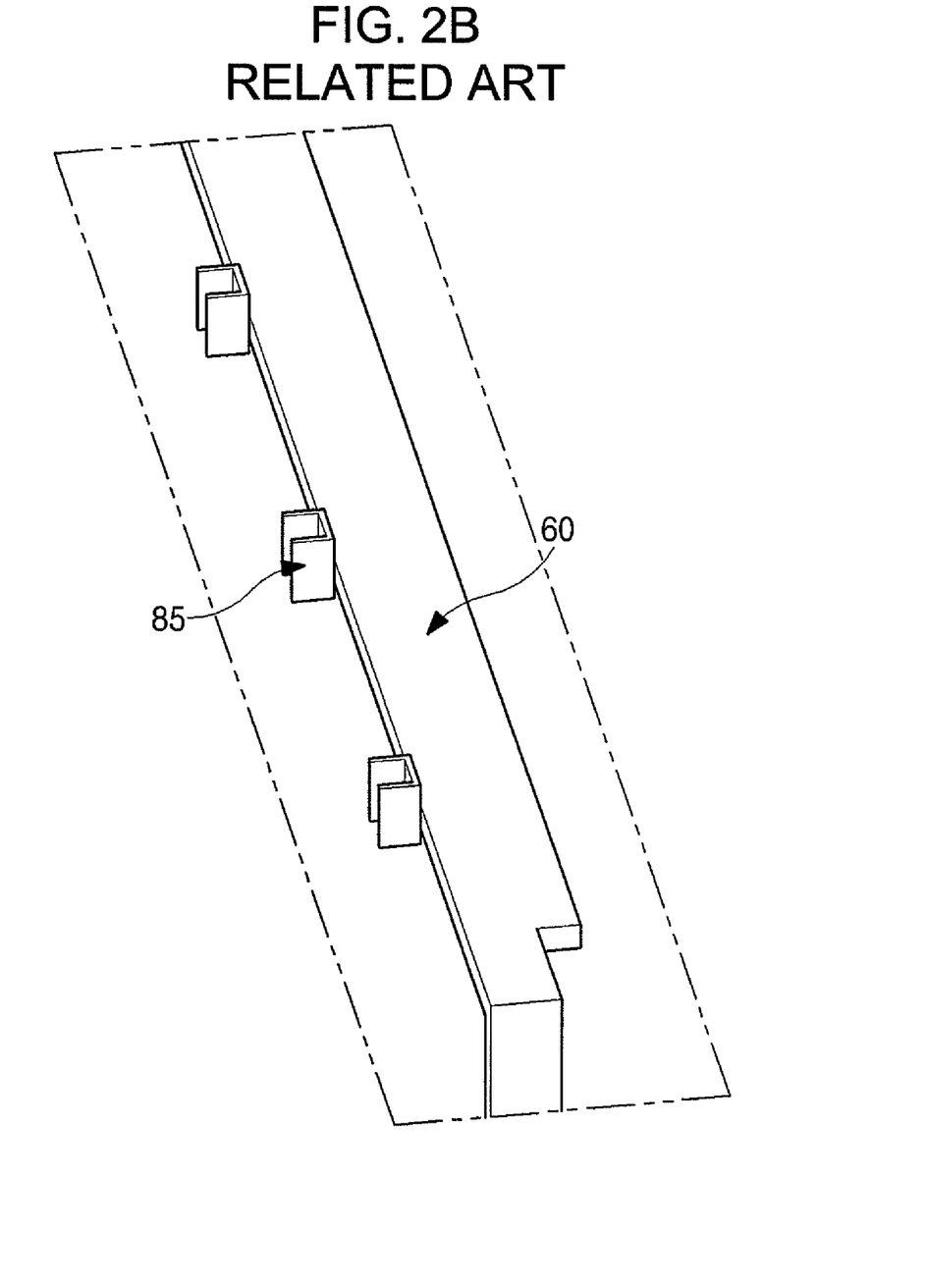
FIG. 2B is a perspective view illustrating a portion of the main supporter of the LCD module according to the related art.

FIG. 2A is a perspective view illustrating a portion of the LCD module according to the related art, and FIG. 2B is a perspective view illustrating a portion of the main supporter of the LCD module according to the related art.

Referring to FIGS. 2A and 2B, the liquid crystal panel 45 is placed on an inner peripheral portion of the main supporter 60. A plurality of COF films 80 connect the data driving PCB 56 to the liquid crystal panel 45. The COF film 80 is bent at about 90 degrees angle along an outside of the main supporter 60, and the data driving PCB 56 is thus placed on the outer side of the main supporter 60.

A plurality of moving obstacles 85 are installed on a side frame of the main supporter 60. The moving obstacle 85 functions to prevent the liquid crystal panel 45 from moving away in a horizontal direction and fix the liquid crystal panel 45 at a right position.

The large-sized LCD modules, for example, of 19 inches or more may have a problem that the liquid crystal panel 45 is lifted up due to the elasticity of the COF film 80 after an assembling process while the smaller-sized LCD modules seldom have the problem.

Figure 3:
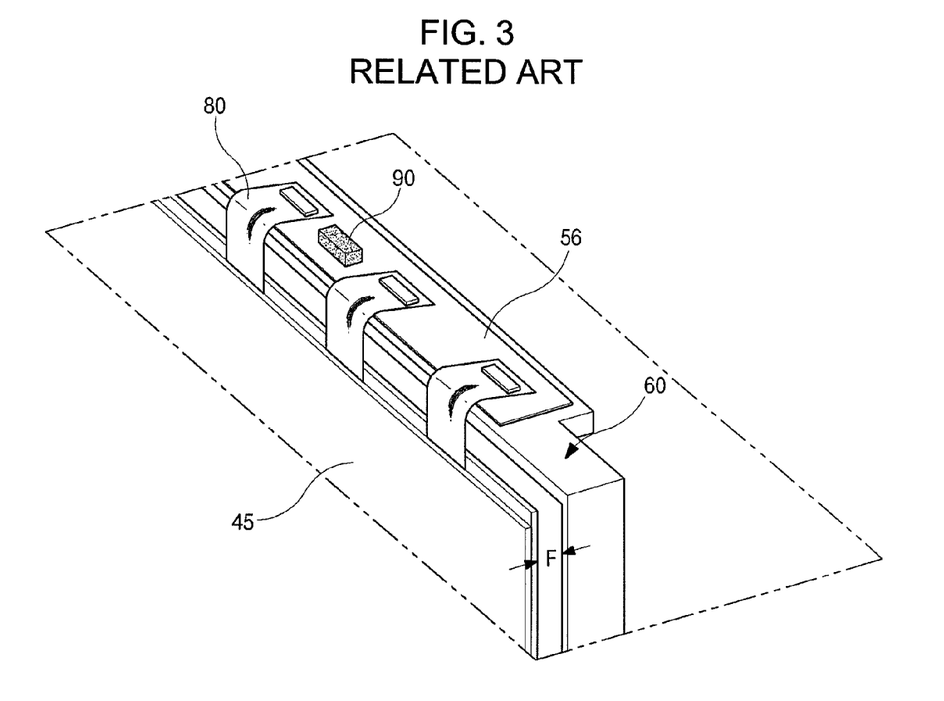
FIG. 3 is a view illustrating the problem that the liquid crystal panel of the LCD module according to the related art is lifted up.

FIG. 3 is a view illustrating the problem that the liquid crystal panel of the LCD module according to the related art is lifted up.

Referring to FIG. 3, the backlight assembly (65 of FIG. 1) is coupled with the main supporter 60, then the liquid crystal panel 45 and the data driving PCB 56 are placed on the main supporter 60, then a gasket 90 is coupled with an outer side of the data driving PCB 56, then the top case (70 of FIG. 1) is assembled, and thus, the LCD module is completed. The gasket 90 functions as a buffer to prevent the data driving PCB 56 from being damaged due to an external impact or pressure in an assembling process. For example, the gasket 90 is made of a styrofoam.

The COF film 80 is bent at about a 90 degree angle by a worker's applying a force to the COF film 80. After the COF film 80 is bent and the gasket 90 is located on the data driving PCB 56, the top case is assembled. When the top case is assembled, the gasket 90 is pressed by a force, for example, the top case, and the data driving PCB 56 is thus closely attached to and fixed to the main supporter 60. Sine the data driving PCB 56 is closely attached to the main supporter 60 due to pressing the gasket 90, the COF film 80 is warped. In other words, the data driving PCB 56 goes toward the main supporter 60 due to pressing the gasket 90, and thus, the data driving PCB 56 changes in position between before assembling the top case and after assembling the top case. This position change of the data driving PCB 56 causes the COF film 80 to be warped. As the LCD module increases in size, and the COF films 80 in the LCD module increase in number. Accordingly, in the large-sized LCD module, the elastic force of the COF films 80 due to the warpage of the COF films 80 is large so that the liquid crystal panel is lifted up by a distance "F".

As described above, the problem of abnormally moving the liquid crystal due to the elastic force of the COF films occurs in the assembling process, and the production efficiency is thus much reduced.

SUMMARY

A liquid crystal display module includes a bottom case; a backlight assembly on the bottom case; a liquid crystal panel on the backlight assembly; a top case covering peripheral portions of the liquid crystal panel; a main supporter having a frame shape and surrounding side portions of the liquid crystal panel; a plurality of guide ribs on an outer side of the main supporter; a driving PCB on the plurality of guide ribs and inclined such that a distance between the driving PCB and the outer side of the main supporter increases along a direction of the bottom case to the top case due to the guide ribs; and a COF film connecting the driving PCB to the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 4:
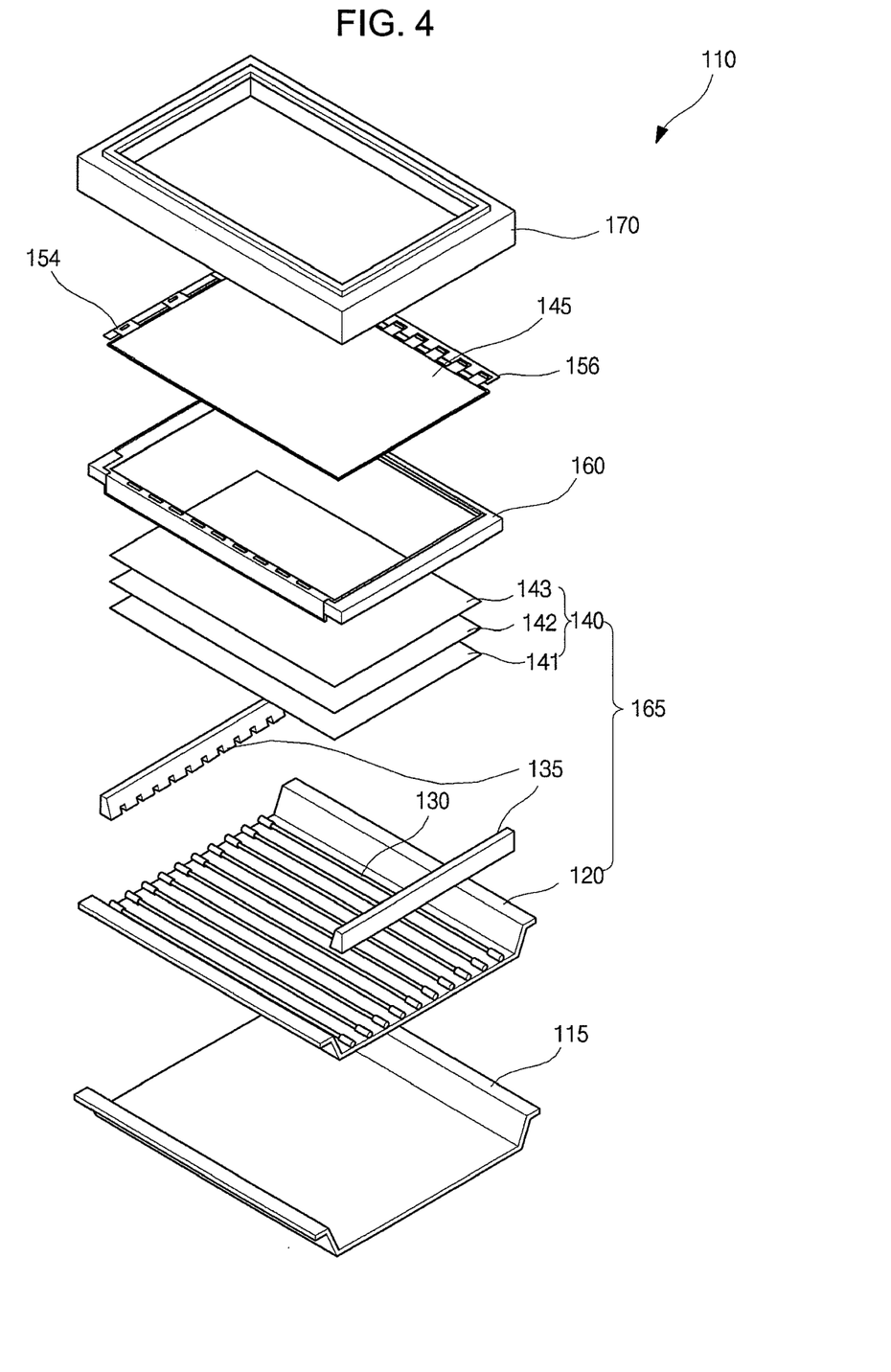
FIG. 4 is a perspective view illustrating an LCD module according to an embodiment of the present invention.
Figure 5:
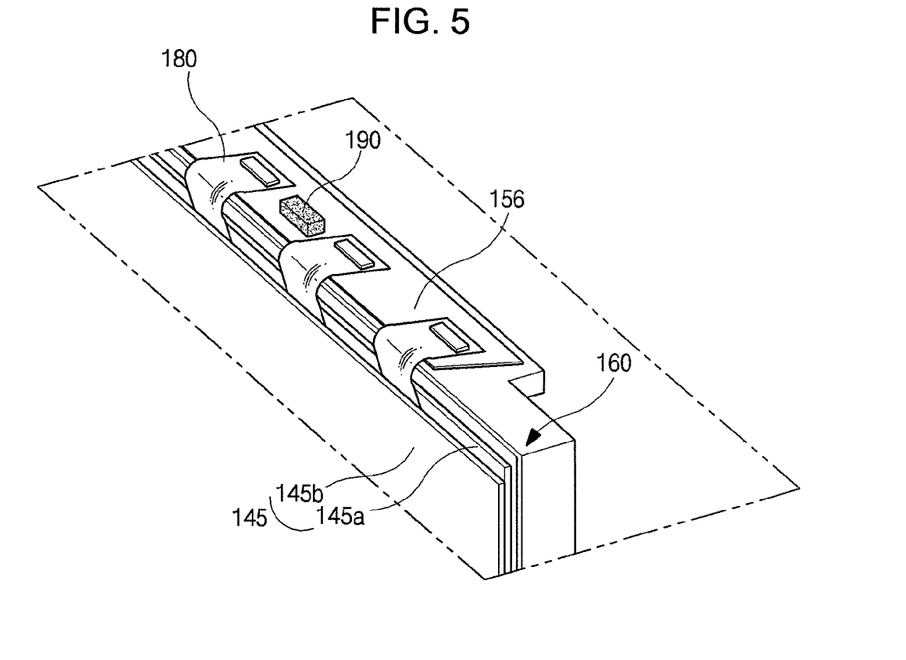
FIG. 5 is a perspective view illustrating a portion of the LCD module of FIG. 4.
Figure 6:
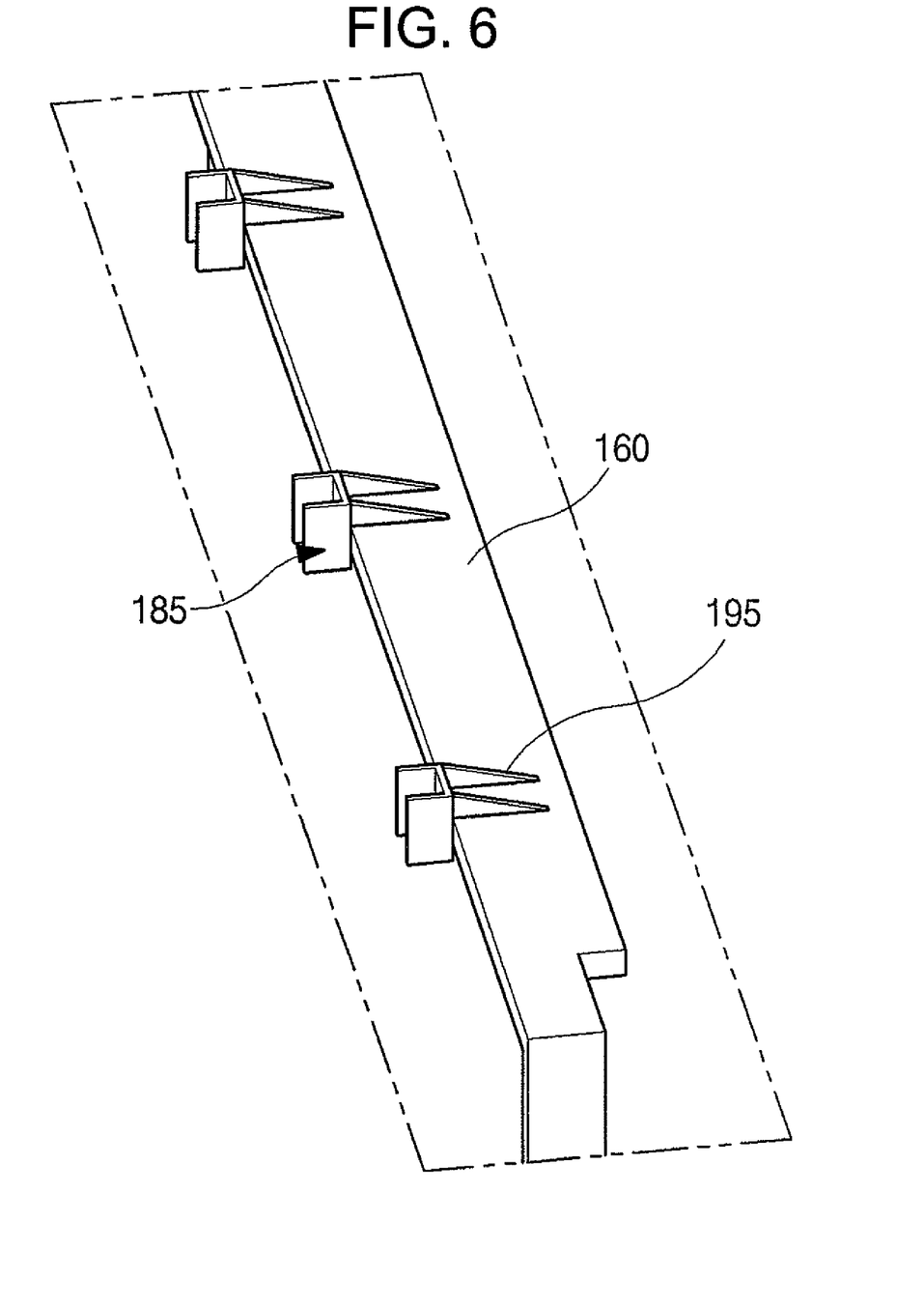
FIG. 6 is a perspective view illustrating a portion of a main supporter of the LCD module of FIG. 4.

FIG. 4 is a perspective view illustrating an LCD module according to an embodiment of the present invention, FIG. 5 is a perspective view illustrating a portion of the LCD module of FIG. 4, and FIG. 6 is a perspective view illustrating a portion of a main supporter of the LCD module of FIG. 4.

Referring to FIGS. 4 to 6, the LCD module 110 includes a liquid crystal panel 145, a backlight assembly 165, a main supporter 160, a top case 170 and a bottom case 115.

The bottom case 115 is located at the bottom of the LCD module 110. A reflector 120 is located on an inner surface of the bottom case 115.

The backlight assembly 165 is located on the reflector 120. The backlight assembly 165 may include a plurality of lamps 130 parallel to one another, and a plurality of optical sheets 140 on the lamps 130. A CCFL (cold cathode fluorescent lamp), a HCFL (hot cathode fluorescent lamp), or an EEFL (external electrode fluorescent lamp) may be used as the lamp 130. Alternatively, LEDs (light emitting diodes) may be used. The lamps 130 may be coupled with an inverter (not shown) and be supplied with a driving voltage.

The plurality of optical sheets 140 may include a diffusion sheet 141, a prism sheet 142 and a protection sheet 143.

The main supporter 130 may have a frame shape, for example, a rectangular frame shape. The main supporter 130 may surround the liquid crystal panel 145, the backlight assembly 165 and the bottom case 115. The main supporter 130 may be coupled with the bottom case 115.

The top case 170 is located at the top of the LCD module 110. The top case 170 covers peripheral portions of the liquid crystal panel 145 and may be coupled with the main supporter 160 and the bottom case 115.

A pair of lamp guiders 135 fixes both ends of the lamps 130. The lamp guiders 135 may be coupled with the bottom case 115.

The liquid crystal panel 145 includes an array substrate 145a and a color filter substrate 145b facing each other and a liquid crystal layer between the array and color filter substrates 145a and 145b.

A gate driving PCB 154 and a data driving PCB 156 are coupled with the liquid crystal panel 145 through a plurality of COF films 180. For example, the gate and data driving PCBs 154 and 156 are coupled with side portions of the array substrate 145a.

At least one gasket 190 may be coupled with an outer side of the data driving PCB 156. The gasket 90 functions as a buffer to prevent the data driving PCB 156 from being damaged due to an external impact or pressure in an assembling process. For example, the gasket 190 is made of a styrofoam. At least one gasket may be further coupled with an outer side of the gate driving PCB 154.

A plurality of moving obstacles 185 may be installed on a side frame of the main supporter 160. The moving obstacle 185 functions to prevent the liquid crystal panel 145 from moving away in a horizontal direction and fix the liquid crystal panel 145 at a right position. The number of the moving obstacles 185 may vary according to a size of the LCD module 110. For example, four through six moving obstacles 185 may be used.

A plurality of guide ribs 195 may be located on an outer side of the main supporter 160. The data driving PCB 156 is placed on the guide ribs 195. Due to the guide ribs 195, the data driving PCB 156 is inclined with respect to the outer side of the main supporter 160 and gets more distant along bottom to top due to the guide ribs 195. In other words, the data driving PCB 156 is at an acute angle to the outer side of the main supporter 160 and a plane of the liquid crystal panel 145. To do this inclination of the data driving PCB 156, a first portion of the guide rib 195 has a width greater than that of a second portion of the guide rib 195 lower than the first portion. For example, the guide rib 195 may increase in width along bottom to top. An outer side of the guide rib 195 may be inclined to be at an acute angle to the outer side of the main supporter 160 and go outward along bottom to top. The guide rib 195 may have a triangular shape. Alternatively, the guide rib 195 may have other shape such that the data driving PCB 156 is at an acute angle to the outer side of the main supporter 160.

Since the data driving PCB 156 is at an acute angle to the liquid crystal panel 145, the COF film may be bent at an acute angle by a worker.

The guide ribs 195 may be formed in a single body with the main supporter 160 or in a separate body from the main supporter 160. The guide ribs 195 may correspond to the moving obstacles 185, respectively. The moving obstacle 185 may be formed in a single body with the main supporter 160 or in a separate body from the main supporter 160. The moving obstacle 185 may be formed in a single body with the guide rib 195 or in a separate body from the guide rib 195.

In assembling the top case 170, the top case 170 presses the gasket 190 on an outer side of the data driving PCB 156, and due to the guide ribs 195, the data driving PCB 156 is not all attached to the outer side of the main supporter 160 but is inclined and more distant from the outer side of the main supporter 160 along bottom to top. Accordingly, a position change of the data driving PCB 156 between before assembling the top case 170 and after assembling the top case 170 can be minimized. Accordingly, warpage of the COF films 180 due to assembling the top case can be minimized and elastic force of the COF films 180 can be thus minimized to hardly move the liquid crystal panel 145. Therefore, the liquid crystal panel 145 can not be lifted up.

A number of COF films connecting the gate driving PCB 154 to the liquid crystal panel 145 may be less than that of the COF films 180 connecting the data driving PCB 156 to the liquid crystal panel 145. Accordingly, the COF films for the gate driving PCB 154 may not much affect moving the liquid crystal panel 145 and the guide ribs may not be located below the gate driving PCB 154. However, it should be understood that the guide ribs can be used for the gate driving PCB 154 in a manner similar to the data driving PCB 156.

Figure 7A:
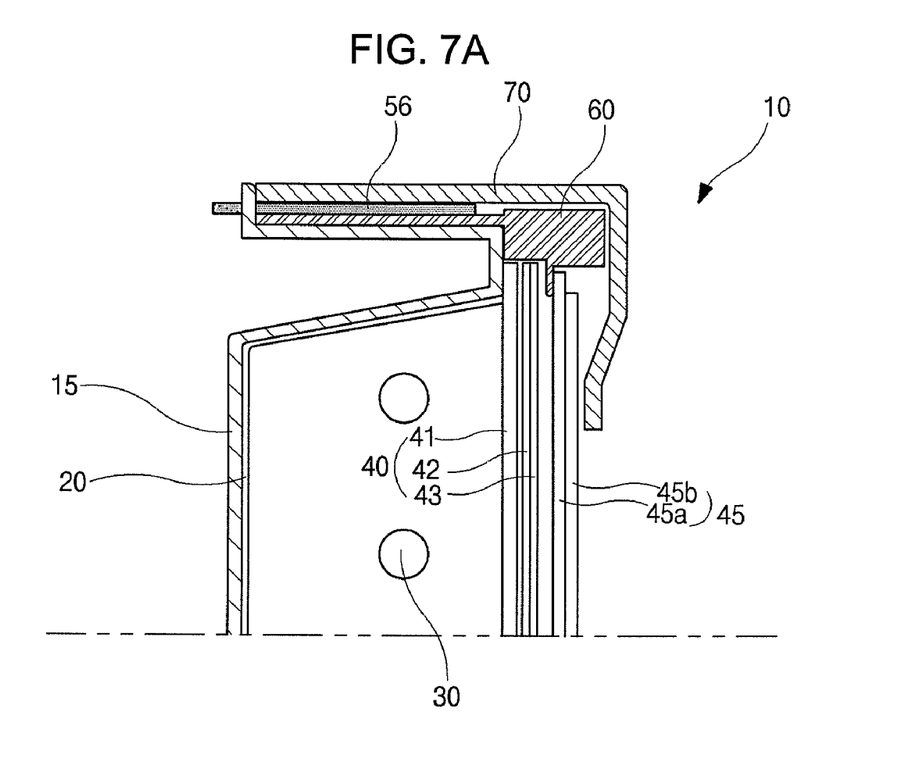
FIGS. 7A and 7B are cross-sectional views illustrating the LCD module of the related art and the LCD module of the embodiment of the present invention, respectively.
Figure 7B:
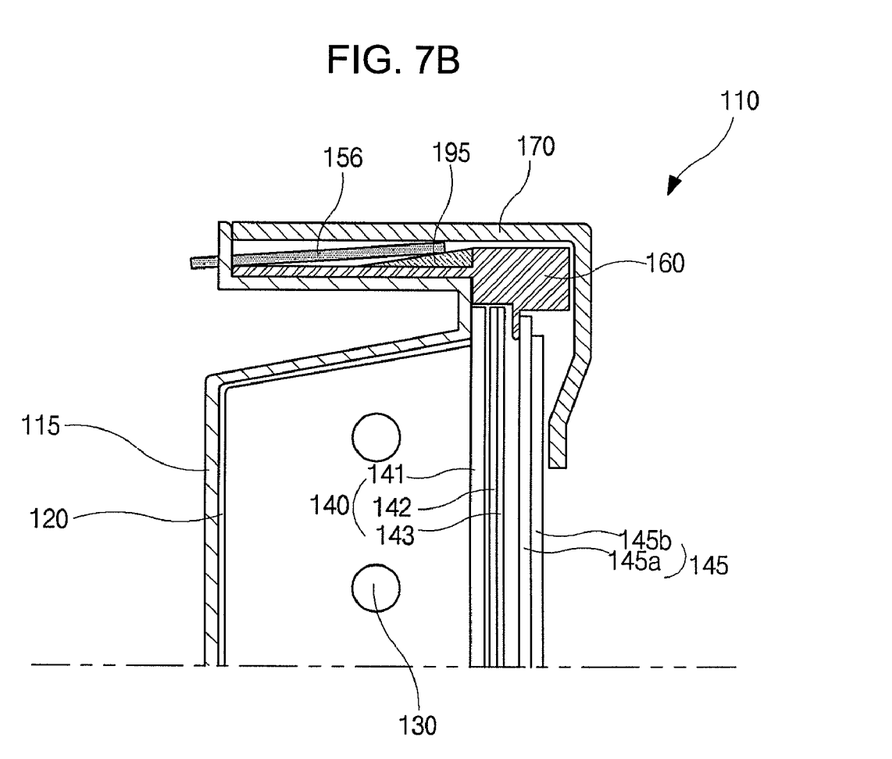

FIGS. 7A and 7B are cross-sectional views illustrating the LCD module of the related art and the LCD module of the embodiment of the present invention, respectively.

Referring to FIG. 7A, the LCD module 10 according to the related art includes a bottom case 15, a reflector 20 on the bottom case 15, a plurality of lamps 30 on the reflector 20, a plurality of optical sheets 40 on the lamps 30, a liquid crystal panel 45 on the optical sheets 40, a main supporter 60 surrounding the liquid crystal panel 45, a data driving PCB 56 on an outer side of the main supporter 60, and a top case 70 surrounding the data driving PCB 56 and the main supporter 60. The data driving PCB 56 is perpendicular to the liquid crystal panel 45 and is connected to the liquid crystal panel 45 through a COF film (80 of FIG. 2A).

Referring to FIG. 7B, the LCD module 110 according to the embodiment of the present invention includes a bottom case 115, a reflector 120 on the bottom case 115, a plurality of lamps 130 on the reflector 120, a plurality of optical sheets 140 on the lamps 130, a liquid crystal panel 145 on the optical sheets 140, a main supporter 160 surrounding the liquid crystal panel 145, a guide rib 195 on an outer side of the main supporter 160, a data driving PCB 156 on the guide rib 195, and a top case 170 surrounding the data driving PCB 156 and the main supporter 160. The data driving PCB 156 is at an acute angle to the liquid crystal panel 145 and is connected to the liquid crystal panel 145 through a COF film (180 of FIG. 5). Since the data driving PCB 156 is inclined and a distance between the data driving PCB 156 and the outer side of the main supporter 145 increases along bottom to top due to the guide rib 195, position change of the data driving PCB 156 along a side direction between before and after an assembling process is minimized compared to that of the related art. Accordingly, the deformation of the COF films is minimized and the elastic force of the COF films is minimized, and thus, the liquid crystal panel can be prevented from being lifted up.

Table 1 shows conditions in an oscillation experiment to evaluate reliability of the LCD module according to the embodiment of the present invention.

TABLE 1

| Amplitude | random |
| --- | --- |
| Frequency | 10 Hz-300 Hz |
| Acceleration | 2.0 G, 2.5 G, 3.0 G |
| Direction | X, Y, Z (30 minutes) |

Referring to Table. 1, the experiment was performed under conditions, random amplitude, frequency of 10 Hz to 300 Hz, acceleration of 2.0 G, 2.5 G and 3.0 G, and in X, Y and Z directions for 30 minutes. Further, even though not shown, a collision experiment was performed under conditions, speed of 2 ms, and acceleration of 100 G, 120 G, 140 G, 160 G, 180 G and 200 G.

Analysis on the oscillation and collision experiments showed that, for the LCD module according to the embodiment of the present invention, line defect does not occur, and screen inspection and whether there are alien substances or not have good results.

When the related art LCD module stands, due to weight and warpage of the LCD module, the COF films are bent and the liquid crystal panel is thus moved. Accordingly, when an upper portion of the standing LCD module is pressed, frictional sound, for example, clicking occurs much. However, in the LCD module according to the embodiment of the present invention, it is shown that the clicking is almost insignificant.

As described in the embodiment, the driving PCB is inclined in the LCD module due to the guide rib, and the deformation of the COF films and thus the elastic force of the COF films can be minimized. Accordingly, the liquid crystal panel can be located at a right position in the LCD module, and the production efficiency and reliability can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) module, comprising: a bottom case; a backlight assembly on the bottom case; a liquid crystal panel on the backlight assembly; a top case covering peripheral portions of the liquid crystal panel; a main supporter having a frame shape and surrounding side portions of the liquid crystal panel; a plurality of guide ribs on an outer side of the main supporter; a driving printed circuit board (PCB) on the plurality of guide ribs and inclined such that a distance between the driving PCB and the outer side of the main supporter increases along a direction of the bottom case to the top case due to the guide ribs; and a chip on film (COF) film connecting the driving PCB to the liquid crystal panel.

2. The module according to claim 1, further comprising at least one gasket on an outer side of the driving PCB and pressed by the top case.

3. The module according to claim 1, wherein a distance between an outer side of the guide rib and the outer side of the main supporter increases along the direction of the bottom case to the top case.

4. The module according to claim 3, wherein the guide rib has a triangular shape in cross-section along the direction of the bottom case to the top case.

5. The module according to claim 1, wherein the guide rib is in a single body with or in a separate body from the main supporter.

6. The module according to claim 1, wherein the driving PCB is a data driving PCB or a gate driving PCB.

7. The module according to claim 1, further comprising a plurality of moving obstacles on a side frame of the main supporter.

8. The module according to claim 1, further comprising a reflector between the backlight assembly and the bottom case.

9. The module according to claim 8, wherein the backlight assembly includes a plurality of lamps on the reflector and a plurality of optical sheets on the lamps.

* * * * *